United States Patent Office 3,273,995
Patented Sept. 20, 1966

3,273,995
RECOVERY OF ZINC FROM ZINC DIE-CAST SCRAP
John A. Ruppert, Washington, D.C., and Paul M. Sullivan, Adelphi, Md., assignors to the United States of America as represented by the Secretary of the Interior
No Drawing. Filed May 22, 1964, Ser. No. 369,644
13 Claims. (Cl. 75—63)

The invention herein described and claimed may be manufactured and used by or for the Government of the United States of America for governmental purposes without the payment of royalties thereon or therefor.

This invention is concerned with the removal of aluminum from zinc-aluminum alloys or mixtures, e.g., zinc die-cast scrap.

Large quantities of zinc die-cast scrap are generated annually, a large part of which originates from grills, fuel pumps, carburetors, trim and hardware of scrapped automobiles and other machinery, or from punchings or factory rejects of these components. A typical mixture of zinc die-cast scrap contains from 3 to 4 percent aluminum and 1 to 3 percent copper. In recent years, however, there has been a tendency to replace the copper with considerably smaller amounts of magnesium.

Present practice in reclaiming zinc die-cast scrap involves distillation in a retort made of silicon carbide and graphite. Die-cast scrap is not usually distilled by itself but is charged into the retort along with a roughly equivalent quantity of galvanizers' dross. An important factor in the processing cost is the limited life of the retorts. After approximately 40 batches have been distilled, the retort must be replaced because of damage caused by repeated removal of solid distillation residues. Other disadvantages of distillation methods are the high temperature required and the enormous amounts of fuel necessary to furnish the heat of vaporization.

It has long been known that a flux of zinc chloride is capable of removing aluminum from molten zinc. For example, in the Sendzimir process for continuously galvanizing sheet steel, it is desirable to add 0.2 percent aluminum to the bath to improve the ductility of the zinc coating. No flux is used in this process because previous experience in the batch hot-dip galvanizing industry has shown that even small amounts of aluminum are not retained in the zinc bath where zinc chloride is one of the flux components. The reason for this is the rapid reaction of aluminum with zinc chloride to form volatile aluminum chloride according to the equation:

$$2Al + 3ZnCl_2 = 3Zn + 2AlCl_3$$

In the above reaction, the free energy change is such that the equilibrium is forced virtually completely to the right. In addition, $AlCl_3$, one of the products on the right side of the equation, is removed continuously from the system so that it may be stated that the reaction proceeds to completion quantitatively. Thus it can be seen that zinc chloride is a very effective flux for the removal of aluminum from zinc. However, as the above equation shows, 1.5 moles of $ZnCl_2$ are required to remove one mole of aluminum; hence, the use of $ZnCl_2$ for this purpose is prohibitively expensive.

It is therefore an object of the present invention to provide an efficient and economical process for removal of aluminum from zinc-aluminum alloys.

It is a further object of the invention to provide such a process for reclaiming zinc from die-cast scrap.

It has now been found that these objectives may be accomplished by treatment of the molten zinc-aluminum alloy with an iron halide which serves as a flux, converting part of the aluminum to aluminum halide and most of the remaining aluminum to a solid, separable, iron-aluminum intermetallic compound.

The reactions taking place in the process of the invention when the preferred flux, ferric chloride, is used are believed to be as follows:

(1) The ferric chloride reacts with aluminum in the melt according to the following reaction:

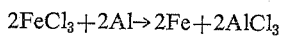
$$2FeCl_3 + 2Al \rightarrow 2Fe + 2AlCl_3$$

(2) The iron set free then reacts with more aluminum:

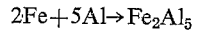
$$2Fe + 5Al \rightarrow Fe_2Al_5$$

The overall reaction is therefore:

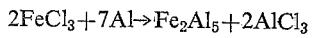
$$2FeCl_3 + 7Al \rightarrow Fe_2Al_5 + 2AlCl_3$$

As may be seen from this equation, the process of the invention requires only 0.286 mol of $FeCl_3$ to remove one mole of aluminum; the process is, therefore, very economical as well as efficient.

Since, however, $FeCl_3$ boils at 315° C. and zinc die-cast alloy melts at approximately 400° C., provision must be made to maintain the $FeCl_3$ in contact with the molten alloy for a time sufficient to achieve the desired reaction. This could be accomplished by conducting the reaction under pressure greater than atmospheric. Applicants have, however, developed two methods for carrying out the desired reaction at atmospheric pressure.

The first and preferred method comprises the addition of suitable salts to depress the vapor pressure of ferric chloride. Sodium, potassium and calcium chlorides or mixtures of these salts have been found satisfactory. A mixture of 2.5 parts of ferric chloride to one part of sodium chloride, for example, will form a highly fluid flux at the melting point of zinc die-cast alloy with no danger of loss of ferric chloride by vaporization. If this quantity of salt mixture is stirred into 36 parts of 4 percent aluminum content die-cast alloy at 450° C., the reaction between the flux and molten alloy will proceed very smoothly, a fume of aluminum chloride being evolved continuously until the ferric chloride is used up. This is an exothermic reaction and the temperature of the melt will rise at a rate inversely proportional to the heat losses. When performed on a kilogram scale in an electrically-heated crucible furnace a temperature rise of 150° C. can be anticipated. Rough thermochemical calculations indicate a theoretical temperature rise of approximately 300° C. assuming no loss of heat from the system.

After the initial temperature rise, the melt is allowed to drop back to 450° C. The end of the reaction is signalled by the cessation of fuming and the solidification of the remaining flux, now composed principally of sodium chloride, on the surface of the melt. The intermetallic compound, believed to be $Fe_2Al_5$ and being lighter than the molten zinc, tends to float as a mush on the top of the melt. The solidified flux is then removed and the melt filtered through a woven glass cloth. This operation is conducted in a special apparatus capable of filtering molten metals. It consists of an upper chamber, the bottom of which comprises a perforated plate covered by a glass fabric filter cloth. A graphite-lined lower chamber or receiver capable of being evacuated is attached to the upper chamber by bolted flanges. The entire apparatus is held within an electrically-heated vertical tube furnace. In operation, the melt from the fluxing operation is placed in the upper chamber under predetermined conditions of time and temperature. When the melt is ready to be filtered, a vacuum pump connected to the receiver is actuated and the liquid phase is forced through the glass cloth and into the receiver. The iron-aluminum intermetallic compound along with some entrapped zinc remains on the cloth as a filter residue. The aluminum content of the alloy is usually reduced to several tenths of one percent by this procedure. This value can be reduced to less than .01 percent, if desired, by a further fluxing treatment with zinc chloride. The filter cake usually has a composition of from 12 to 25 percent aluminum and 11 to 20 percent iron depending upon the quantity of ferric chloride used and the temperature of filtration. The zinc remaining in the filter cake can be recovered by either conventional atmospheric pressure distillation or vacuum distillation.

The alternative method of reacting ferric chloride with molten die-cast alloy consists in making up pellets of this salt by a briquetting operation and submerging them below the surface of the melt. A flux cover comprising an eutectic mixture of sodium and calcium chlorides is maintained over the molten alloy. This accomplishes the dual purpose of absorbing any unreacted ferric chloride vapor bubbling to the surface as well as protecting the metal from oxidation. The pellets are introduced one at a time to the bottom of the melt and allowed to vaporize directly into the metal. Having a lower specific gravity than the molten metal, the pellets are held submerged by means of a perforated inverted cup and attached rod, both made of graphite. When the calculated amount of ferric chloride has been used up, the flux cover is removed and the melt filtered as before to separate the iron-aluminum intermetallic compound.

The following examples are given to more specifically illustrate the invention:

*Example 1.*—One thousand grams of a zinc-base diecast alloy containing 3.94 percent aluminum were melted at 450° C. in a graphite crucible heated by a resistance wound pot furnace. Temperature was regulated by a Chromel-Alumel thermocouple and automatic controller. A mixture of 68.7 grams of $FeCl_3$ and 24.8 grams of NaCl was stirred into the melt using a motor-driven glass agitator. The salts began to melt almost immediately and formed a liquid flux covering the surface of the melt. Fumes of $AlCl_3$ were given off. After 120 minutes no more fumes were evolved and the remaining flux solidified. The melt was poured into a mold, allowed to cool and the flux removed. The metal, weighing 992 grams, was transferred to the filter and held at 500° C. for one hour. Upon filtering, the filtrate weighed 868 grams and contained 0.48 percent aluminum and 0.01 percent iron. The filter residue weighed 121.3 grams and contained 21.5 percent aluminum and 15.8 percent iron.

*Example 2.*—One thousand grams of zinc-base diecast alloy containing 3.94 percent aluminum were heated to 450° C. and a mixture of 75.6 grams of $FeCl_3$ and 27.3 grams of NaCl added with stirring. After a fluxing time of 150 minutes, the melt was cooled and the remaining flux removed, resulting in a metal weight of 1003 grams. The metal was filtered under the same conditions as Example 1, giving 822 grams of filtrate containing 0.22 percent aluminum and 0.03 percent iron and 177.7 grams of filter residue containing 14.8 percent aluminum and 13.7 percent iron.

*Example 3.*—One thousand grams of zinc-base diecast alloy containing 3.94 percent aluminum were stirred for 180 minutes with 82.5 grams $FeCl_3$ and 29.8 grams NaCl with the furnace control set at 450° C. After cooling and flux removal, the remaining metal weighed 1009 grams. Filtration took place under the same conditions as in Example 1. There were obtained 788 grams of filtrate containing 0.12 percent aluminum and 0.01 percent iron and 219 grams of filter residue containing 12.6 percent aluminum and 11.5 percent iron.

*Example 4.*—One thousand grams of zinc-base diecast alloy containing 4.13 percent aluminum were stirred with 68.7 grams of $FeCl_3$ and 31.5 grams of KCl at 500° C. for 80 minutes. After cooling and flux removal, there remained 1006 grams of metal. Upon filtration under the same conditions as in Example 1, there were obtained 876 grams of filtrate containing 0.31 percent aluminum and 0.04 percent iron and 126.2 grams of filter residue containing 20.5 percent aluminum and 16.8 percent iron.

*Example 5.*—One thousand grams of zinc-base diecast alloy containing 4.13 percent aluminum were stirred for 140 minutes with a flux containing 68.7 grams of $FeCl_3$, 20 grams $CaCl_2$ and 10 grams NaCl at 500° C. The melt was then cooled, the residual flux removed and the metal weight found to be 975 grams. After filtration of the metal under the same conditions as in Example 1, there resulted 837 grams of filtrate containing 0.77 percent aluminum and 0.03 percent iron and 137.9 grams of filter residue containing 17.3 percent aluminum and 11.1 percent iron.

*Example 6.*—One thousand grams of zinc-base diecast alloy containing 4.13 percent aluminum were melted at 555° C. and covered with a flux containing 31.7 grams of NaCl and 68.3 grams of $CaCl_2$. This ratio of salts formed an eutectic that was molten at this temperature. Cylindrical-shaped ferric chloride pellets of ½" diameter, ⅜" height and weighing 4 grams each were made up in a press. While slowly stirring the melt, the pellets were held one at a time below the surface by means of a perforated inverted cup. A total weight of 68.7 grams of pellets was evaporated into the melt over an interval of 145 minutes. The melt was then cooled, the flux removed and metal weight found to be 985 grams. Filtration was performed as in Example 1. There were obtained 872 grams of filtrate containing 0.25 percent aluminum and 0.06 percent iron. Filter residue amounted to 110.8 grams containing 22.7 percent aluminum and 19.6 percent iron.

*Example 7.*—One thousand grams of zinc-base diecast alloy containing 4.05 percent aluminum were heated to 450° C. and a mixture of 48 grams of $FeCl_3$ and 17.4 grams of NaCl added with stirring. After a fluxing time of 25 minutes, the melt was cooled and the remaining flux removed, resulting in a metal weight of 1004 grams. The metal was transferred to the filter and held at 450° C. for one hour. After filtering at this temperature there were obtained 888 grams of filtrate containing 1.40 percent aluminum and .06 percent iron and 108.2 grams of filter residue containing 19.1 percent aluminum and 11.5 percent iron.

*Example 8.*—One thousand grams of zinc-base diecase alloy containing 4.05 percent aluminum were heated to 450° C. and a mixture of 48 grams of $FeCl_3$ and 17.4 grams of NaCl added with stirring. After a fluxing time of 40 minutes, the melt was cooled and the remaining flux removed, resulting in a metal weight of 1000 grams. The metal was transferred to the filter and held at 600° C. for one hour. After filtering at this temperature, there were obtained 920 grams of filtrate containing 1.40 percent aluminum and .01 percent iron and 78 grams of filter residue containing 25.3 percent aluminum and 18.4 percent iron.

*Example 9.*—One thousand grams of zinc-base diecast alloy containing 3.9 percent aluminum were heated to 450° C. and a mixture of 61.8 grams of $FeCl_3$ and 22.3 grams of NaCl added with stirring. After a fluxing time of 120 minutes, the melt was cooled and the remaining flux removed, resulting in a metal weight of 1017 grams. The metal was transferred to the filter and held at 600° C. for one hour. After filtering at this temperature there were obtained 886 grams of filtrate containing .60 percent aluminum and .02 percent iron and 112.5 grams of filter residue containing 21.4 percent aluminum and 17.6 percent iron.

*Example 10.*—One thousand grams of zinc-base diecast alloy containing 4.1 percent aluminum were heated to 450° C. and a mixture of 88.1 grams of $FeCl_3$ and 31.9 grams of NaCl added with stirring. After a fluxing time of 120 minutes, the melt was cooled and the remaining flux removed, resulting in a metal weight of 1011 grams. The metal was transferred to the filter and held at 600° C. for one hour. After filtering at this temperature there were obtained 903 grams of filtrate containing .23 percent aluminum and .09 percent iron and 99.0 grams of filter residue containing 21.8 percent aluminum and 27.0 percent iron.

The above examples are merely illustrative; obviously many modifications may be made in reagents, amounts of materials, temperature, apparatus, etc., without departing from the spirit and scope of the invention.

Although sodium chloride has been found to be very effective for depressing the vapor pressure of the iron compound, other alkali or alkaline earth halides such as potassium or calcium chloride or mixtures may be used for this purpose. Amounts of these salts are not critical and will vary widely according to the type of salt used, size of the alloy batch to be treated, amount of iron halide, etc. Optimum amounts of the salt will best be determined empirically.

The invention is also not restricted to the above-described methods of contacting the iron halide with the alloy since any method ensuring contact for a time sufficient to effect the desired reaction could be used, e.g., the iron halide could be distilled from a separate vessel or chamber into the molten material.

Media other than the glass cloth of the examples, e.g., woven asbestos, metallic screen, porous carbon, crushed refractory material or stone etc., could be used in the filtration step. Furthermore, means other than filtration could be used to separate the iron-aluminum intermetallic compound. Simple skimming could be used, though at some loss in efficiency of zinc recovery. Centrifugation could also be used as a separation technique.

If the process is conducted on a tonnage basis, using $FeCl_3$ as flux, the $AlCl_3$ fumes given off may be collected in a bag house and sold to offset a portion of the cost of the process. Residual flux, consisting principally of the alkali or alkaline earth halide, may be mixed with fresh iron halide and reused in the process. Because of the exothermic nature of the fluxing operation, any large scale treatment makes it advisable to add the flux in increments to the molten alloy while simultaneously making further alloy additions in the form of cold ingots in order to maintain the temperature at a constant level.

Although $FeCl_3$ has been found to give particularly good results, the invention is not limited to this compound. Any iron halide, e.g., ferric bromide, ferrous chloride, etc., may be used provided a suitable salt is employed to solubilize or lower the vapor pressure of the iron halide. All of these iron halides possess the unique characteristic that both the cation and anion react with the aluminum in the zinc-aluminum alloy as described above in connection with $FeCl_3$.

Although a temperature of about 450° C. for the molten alloy generally gives very satisfactory results, the optimum temperature may vary considerably depending on the specific composition of the zinc-aluminum alloy, the iron halide employed, salt employed for dissolving or lowering the vapor pressure of the iron halide, etc. Again, the optimum value is best determined empirically.

As will be apparent from the above description, operation of the process of the invention is relatively simple and does not require elaborate or expensive equipment. Only small amounts of inexpensive reagents are required. Temperatures required are relatively low and must be maintained for only short periods, part of the heat requirements being furnished by the exothermic nature of the fluxing operation. In addition, a marketable by-product, aluminum chloride, is generated in the preferred embodiment of the process. Thus the advantages of the process of the invention in providing an efficient and inexpensive method for removing aluminum from zinc-aluminum alloys is evident.

What is claimed is:

1. A method for removal of aluminum from a zinc-aluminum alloy comprising forming a melt of the alloy; treating the molten alloy with a flux comprising an iron halide and maintaining the iron halide in contact with the molten alloy for a time sufficient to achieve the formation of (1) an aluminum halide and (2) an iron-aluminum intermetallic compound; removing any excess flux from the surface of the melt and separating the iron-aluminum intermetallic compound from the residual molten zinc.

2. The method of claim 1 in which the zinc-aluminum alloy is die-cast scrap.

3. The method of claim 1 in which the temperature of the melt is about 450° C.

4. The method of claim 1 in which the iron halide is ferric chloride.

5. The method of claim 1 in which an additional flux material selected from the group consisting of alkali metal halides and alkaline earth metal halides and mixtures thereof, is added to the molten alloy.

6. The method of claim 5 in which the iron compound is ferric chloride.

7. The method of claim 6 in which the additional flux material is sodium chloride.

8. The method of claim 6 in which the additional flux material is potassium chloride.

9. The method of claim 6 in which the additional flux material is a mixture of sodium chloride and calcium chloride.

10. The method of claim 1 in which pellets of the flux are held beneath the surface of the molten alloy for a time sufficient to permit reaction with the aluminum in the alloy.

11. The method of claim 10 in which the pellets are held beneath the surface of the molten alloy by means of an inverted perforated cup.

12. The method of claim 1 in which the iron-aluminum intermetallic compound is removed from the molten zinc by filtration.

13. The method of claim 12 in which the intermetallic compound is removed by filtration through a glass cloth.

References Cited by the Examiner

UNITED STATES PATENTS

| | | | |
|---|---|---|---|
| 1,298,229 | 3/1919 | Levy | 75—93 X |
| 1,515,140 | 11/1924 | Bornemann | 75—63 |
| 1,596,888 | 8/1926 | Pacz | 75—93 |
| 1,954,463 | 4/1934 | Thompson et al. | 75—63 |
| 2,452,665 | 11/1948 | Kroll et al. | 75—63 |

DAVID L. RECK, *Primary Examiner.*

H. W. TARRING, *Assistant Examiner.*

UNITED STATES PATENT OFFICE
CERTIFICATE OF CORRECTION

Patent No. 3,273,995  September 20, 1966

John A. Ruppert et al.

It is hereby certified that error appears in the above numbered patent requiring correction and that the said Letters Patent should read as corrected below.

Column 5, line 57, strike out "lowering the vapor pressure of iron halide, etc. Again," and insert same after "dissolving or" in line 52, same column 5.

Signed and sealed this 29th day of August 1967.

(SEAL)
Attest:

ERNEST W. SWIDER
Attesting Officer

EDWARD J. BRENNER
Commissioner of Patents